United States Patent [19]

Watson, Sr.

[11] 4,421,864
[45] Dec. 20, 1983

[54] IMPROVED ION EXCHANGE PARTICLE REGENERATION METHOD

[75] Inventor: John D. Watson, Sr., Lake Jackson, Tex.

[73] Assignee: The Dow Chemical Company, Midland, Mich.

[21] Appl. No.: 328,964

[22] Filed: Dec. 9, 1981

[51] Int. Cl.³ .............................................. B01J 49/00
[52] U.S. Cl. ...................................................... 521/26
[58] Field of Search ........................................... 521/26

[56] References Cited

U.S. PATENT DOCUMENTS

| | | | |
|---|---|---|---|
| 2,789,036 | 4/1957 | Tillman | 23/84 |
| 3,042,491 | 7/1962 | Smith | 23/184 |
| 3,240,699 | 3/1966 | Duff et al. | 210/35 |
| 3,502,599 | 3/1970 | Fries | 260/2.1 |
| 3,527,718 | 9/1970 | Coburn | 260/2.1 |
| 3,627,705 | 12/1971 | Kingsbury | 260/2.2 |
| 3,645,921 | 2/1972 | Salem et al. | 260/2.1 |
| 3,650,948 | 3/1972 | Burriat et al. | 521/26 |
| 3,681,214 | 8/1972 | Ionescu et al. | 204/96 |
| 4,154,801 | 5/1979 | Wheaton | 423/181 |
| 4,379,855 | 4/1983 | Doron et al. | 521/26 |

FOREIGN PATENT DOCUMENTS

| | | | |
|---|---|---|---|
| 52-149296 | 12/1977 | Japan . | |
| 54-97579 | 8/1979 | Japan | 54/26 |

OTHER PUBLICATIONS

British 813,523, The Dow Chemical Company, 5/21/59, Removing Chlorides and Chlorates from Caustic Liquor.

NL 7705-051, Stamicarbon BV.

Primary Examiner—Joseph L. Schofer
Assistant Examiner—Peter F. Kulkosky

[57] ABSTRACT

A method of regenerating particles in an ion exchange column wherein the physical characteristics of a regenerating fluid cause regenerated particles to be displaced from the original bed of particles and flow in a direction countercurrent to that of the fluid.

10 Claims, 6 Drawing Figures

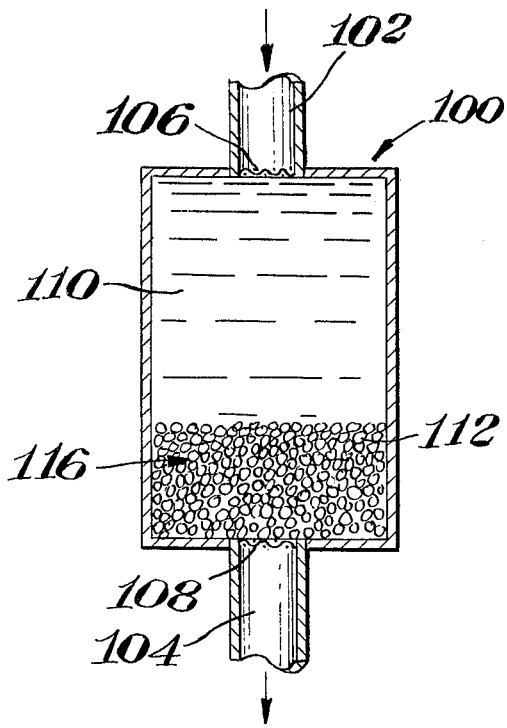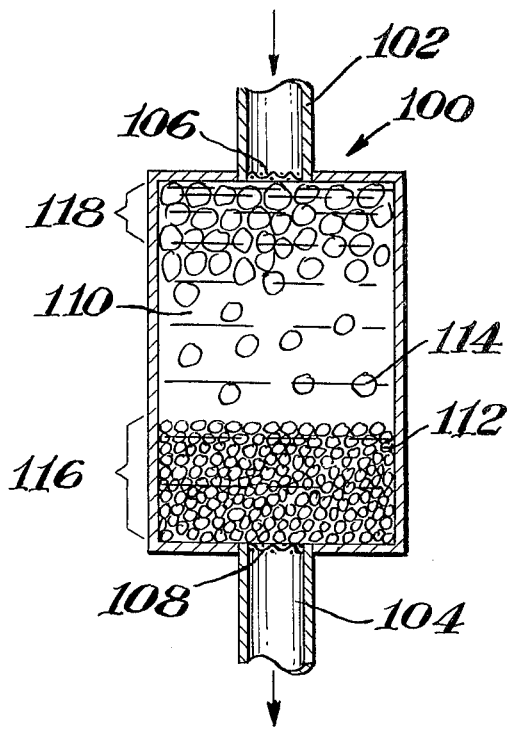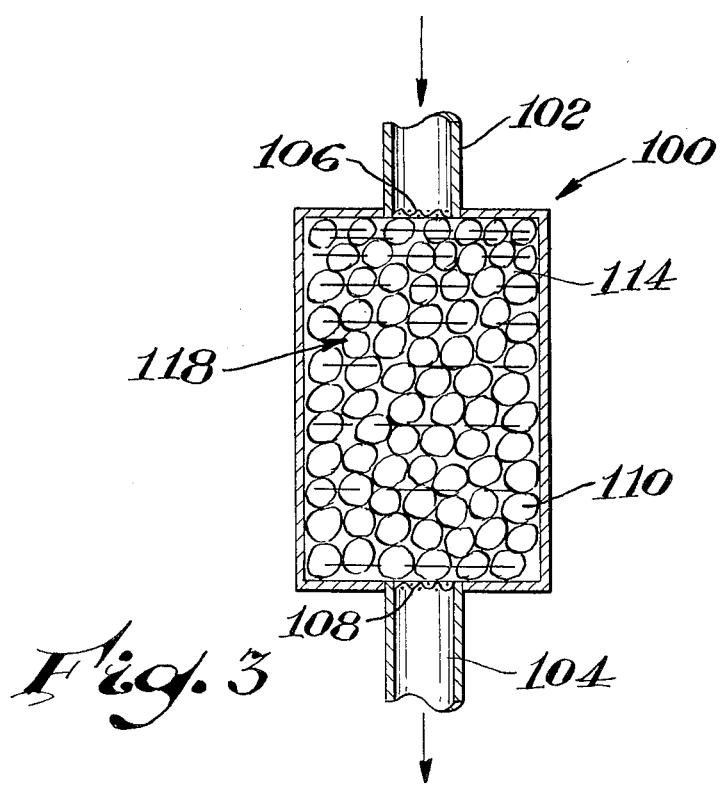

IMPROVED ION EXCHANGE PARTICLE REGENERATION METHOD

This invention relates to ion exchange methods and particularly to an improved method of regenerating ion exchange resin beds.

Ion exchange resin processes are commonly used in many kinds of chemical removal processes. In use, ion exchange resins must be periodically regenerated. To do so, a regenerating solution is flowed through the bed of depleted ion exchange resin and ions are exchanged between the regenerating solution and the depleted resin. The resin is then ready for reuse in the process.

A severe problem is frequently encountered when gel resins are regenerated. Regeneration causes these resins to swell to 110–200 percent of their unregenerated volume. Such swelling causes resin particles to press against other resin particles, causing crushing or physical deterioration of the resin particles. Additionally, such swelling exerts tremendous forces against the walls of a container holding the resin bed. Frequently, the walls of the container rupture as a result of the pressure.

BRIEF DESCRIPTION OF THE INVENTION

The invention is an improved method for regenerating beds of ion exchange gel resin particles to minimize the problems caused by the resin particles swelling upon regeneration.

The invention is a method for regenerating ion exchange particles of the type wherein a regenerating fluid is flowed through a bed of unregenerated or spent ion exchange particles and ions are exchanged between the fluid and the particles, thereby forming regenerated ion exchange particles.

In the improvement method, a regenerating fluid which has a density sufficiently different from that of the regenerated particles to cause the regenerated particles to be displaced from the bed is flowed through the particle bed. This flow displaces the particles from the bed and causes then to flow in a direction substantially countercurrent to that of the regenerating fluid. The particles are then reformed into a second bed of regenerated particles.

BRIEF DESCRIPTION OF THE DRAWINGS

FIGS. 1, 2 and 3 show an ion exchange resin in a column being regenerated accordng to the invention. The three figures represent a time sequence view of the invention.

DETAILED DESCRIPTION OF THE DRAWINGS

Figure 4:
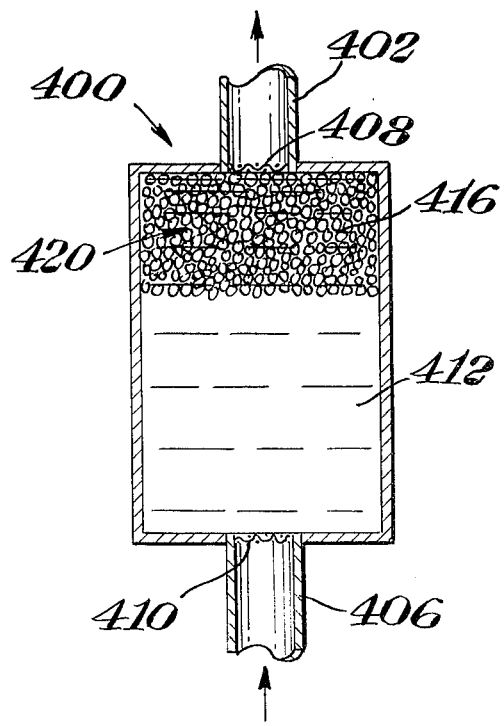
FIGS. 4, 5 and 6 represent a time sequence of views of another embodiment of the invention.

FIGS. 1, 2 and 3 show an ion exchange column 100 having a fluid inlet 102 and a fluid outlet 104. Contained within the column is a plurality of unregenerated ion exchange particles 112 which are agglomerated to form a bed 116. Retaining means 106 and 108 are optionally located within the column to prevent the ion exchange particles 112 from flowing out of the column 100. Conveniently, the retaining means 106 and 108 may be a wire screen or a narrowing of the flow path.

The physical dimensions or shape of the column 100 is not critical to the invention. Thus, the invention may be used in any ion exchange column, which is sufficiently large to hold, without crushing, regenerated ion exchange particles.

Figure 5:
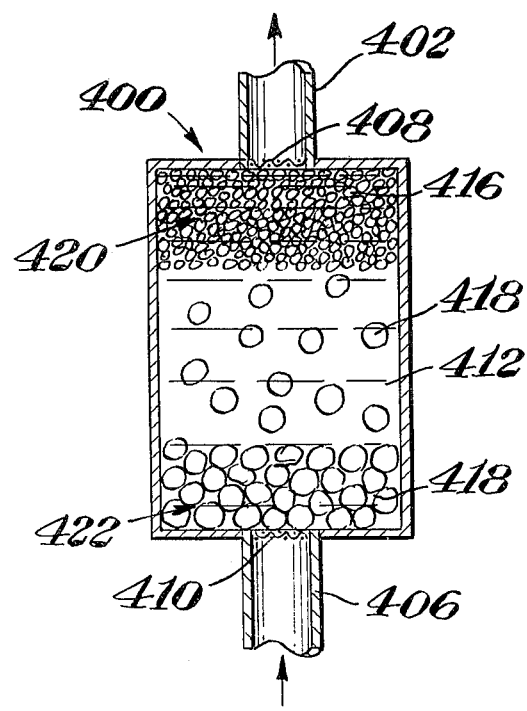
Figure 6:
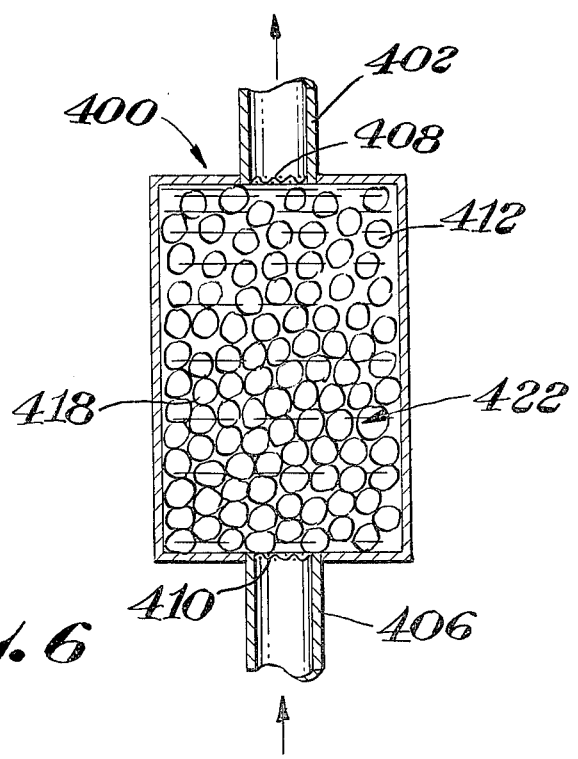

The regenerating method may be operated in two basic ways. The components may be designed so that the regenerated resin particles are less dense than the regenerating fluid and will float upon being regenerated, as shown in FIGS. 1–3. Or, the components may be designed so that the regenerated particles are denser than the regenerating fluid and will sink in the fluid, as shown in FIGS. 4–6.

Since the density of gel resin particles is not easily modified, the preferred method of operation is by adjusting the concentration of the regenerating fluid (thereby adjusting its density).

Attention is now directed to FIG. 1. In this embodiment, a regenerating fluid is employed which has a density greater than the density of the ion exchange particles. FIGS. 1, 2 and 3 illustrate a regeneration method where the regenerating fluid 110 has a density greater than that of regenerated particles 114, thus causing the particles to float in the fluid. In this embodiment, the fluid 110 was flowed in a generally downward direction.

To regenerate the unregenerated ion exchange particles 112, a regenerating fluid 110 is flowed into the column 100 through a fluid inlet 102. The fluid 110 is flowed through the retaining means 106 and through the bed of unregenerated ion exchange particles 116. After flowing through the bed of particles 116, the fluid is flowed out of the column 100 through retaining means 108 and through the fluid outlet 104.

Attention is now directed to FIG. 2. As the regenerating fluid 110 flows through the bed of ion exchange particles 116, ions are exchanged between the regenerating fluid 110 and the individual ion exchange particles 112. During this exchange, unregenerated ion exchange particles 112 are converted into regenerated ion exchange particles 114. Since the regenerated particles 114 have a density less than the regenerating fluid 110, they rise in the fluid and are displaced from the bed of ion exchange particles 116. They are then caused to flow in a direction substantially countercurrent to that of the regenerating fluid, i.e., in a generally upward direction in this embodiment. They are prevented from flowing out of the column 100 by retaining means 106, thus they form a bed 118 of regenerated ion exchange particles 114.

FIG. 3 shows the column 100 in a regenerated state, having a bed 118 of regenerated ion exchange particles 114.

The regenerating process may be continued until the desired number of ion exchange particles have been regenerated. In practice, substantially all of the particles would be regenerated so as to minimize the number of regeneration cycles. However, only a portion of the particles may be regenerated and still fall within the scope of the invention.

Now that the particles have been regenerated, the fluid to be purified is then flowed through the column and the bed of particles. The direction of flow of the fluid is not critical. Regardless of the direction of flow, the particles will be pushed toward the outlet end of the column.

FIGS. 4, 5 and 6 illustrate another embodiment of the invention. They show a regeneration process where regenerated ion exchange particles 418 have a density greater than that of the regenerating fluid 412. This density difference causes the regenerated ion exchange particles to sink in the fluid, i.e., in a generally downward direction. In this embodiment, the fluid is flowed in a generally upward direction.

FIGS. 4, 5 and 6 show an ion exchange column 400 having a fluid inlet 406 and a fluid outlet 402. Contained within the column is a plurality of unregenerated ion exchange particles 416 which are agglomerated to form a bed 420. Retaining means 408 and 410 are located within the column to prevent the ion exchange particles 416 from flowing out of the column 400. Conveniently, the retaining means 408 and 410 may be a wire screen.

The physical dimensions or shape of the column 400 are, again, not critical to the invention.

Referring to FIG. 4, to regenerate the unregenerated ion exchange particles 416, a regenerating fluid 412 is flowed into the column 400 through a fluid inlet 410. The fluid 412 is flowed through the retaining means 410 and through the bed of unregenerated ion exchange particles 420. After flowing through the bed of particles 420, the fluid is flowed out of the column 400 through retaining means 408 and through the fluid outlet 402.

Attention is now directed to FIG. 5. As the regenerating fluid 412 flows through the bed of ion exchange particles 420, ions are exchanged between the regenerating fluid 412 and the individual ion exchange particles 416. During this exchange, unregenerated ion exchange particles 416 are converted into regenerated ion exchange particles 418. Having a density greater than the regenerating fluid 412, the regenerated ion exchange particles 418 are displaced from the bed of ion exchange particles 420 and are caused to flow in a direction substantially countercurrent to that of the regenerating fluid.

In the embodiment herein illustrated, the particles flow in a generally downward direction. They are prevented from flowing out of the column 400 by retaining means 410, thus forming a bed 422 of regenerated ion exchange particles 418.

FIG. 6 shows the column 100 in a regenerated state, having a bed 122 of regenerated ion exchange particles 418.

It is critical to the invention that the combined effects of several factors be balanced so that regenerated particles will be displaced from the bed and flow countercurrent to the flow direction of the fluid. Such factors are well known to those skilled in the art and include such things as:

(1) acceleration of gravity;
(2) mass of the ion exchange particle;
(3) density of the particle;
(4) density of the fluid;
(5) the projected area of the particle in the direction of motion;
(6) friction between the fluid and the particle;
(7) the physical shape of the particle; and
(8) flow rate of the fluid.

Persons skilled in the art will quickly be able to balance these variables to obtain the desired result. A good discussion of such calculations is found in *John H. Perry's Chemical Engineers' Handbook*, 4th Edition, R. H. Perry, C. H. Chilton and S. D. Kirkpatrick, McGraw Hill Publishing Co., New York (1963), pp. 5-59 to 5-62. Cited therein are additional references to said calculations.

The invention may be used to regenerate any gel ion exchange particle. Gel type ion exchange particles shrink and expand as they are used and regenerated. Examples of such resins include styrene divinyl benzene gel resins. As these particles are used in an ion exchange process, they shrink. However, upon regeneration, they swell back to near their original size. Shrinkage and expansion values of 50-200 volume percent are common. The herein described regeneration method displaces regenerated ion exchange particles from the bed, and thus, crushing of the particles due to their swelling against each other is minimized. Likewise, the possibility of the ion exchange column walls being ruptured due to the unrelieved pressure of the expanding particles is minimized.

The density difference between the regenerating fluid and the regenerated resin is not critical. However, there must be a difference. The greater the difference in density, the faster the regenerated particles will float or sink in the regenerating fluid. Although almost any density difference is operable, density differences of from about 0.01 to about 100 pounds per cubic foot are most commonly encountered. Preferably, the density difference should be at least about 0.1 pound per cubic foot.

Various regenerating fluids may be used in the practice of the herein described method. The selection of the regenerating fluid for a particular process will depend upon the type of resin (anion or cation) and upon the chemical and physical characteristics of the resin, i.e., the fluid will not destroy the resin. Commonly used fluids are aqueous NaCl, HCl, $MgCl_2$ and NaBr. Water may also be used in certain processes.

Fluids from which ions may be removed in ion exchange processes include such things as water, aqueous NaOH, NaCl, $MgCl_2$, $CaCl_2$, etc.

A process for which the herein-described invention is particularly useful is the removal of $NaClO_3$ impurities from sodium hydroxide solutions. In such a process, a 40-60 weight percent NaOH aqueous solution containing from 25-10,000 parts per million of $NaClO_3$ is flowed through a bed of styrene divinyl benzene gel resin particles. Ion exchange occurs and at least a portion of the $NaClO_3$ impurities are removed from the NaOH solution by the resin particles. The flow of the 40-60 weight percent NaOH solution is stopped and a second NaOH solution is flowed through the bed of particles. This second solution is aqueous and has a concentration of from about 15 to about 30 weight percent NaOH. Thereafter, a NaCl regenerating fluid is flowed through the bed of particles to regenerate the particles. The second NaOH solution acts as a buffer-type solution and minimizes resin degradation which would be caused if the NaCl solution directly followed the 40-60% caustic solution. As the resin particles are regenerated by the NaCl fluid, they expand in physical size. This expansion causes their density to change and they begin to travel to the other end of the resin column as they are displaced by the regenerating fluid.

This displacement prevents the expanding particles from crushing each other. The regenerated particles are reformed into another bed of regenerated particles and the 15-30% NaOH fluid is flowed through the bed. Thereafter, the 40-60% impurity bearing NaOH solution is flowed through the bed. The process may be repeated.

EXAMPLE

A column 63.5 cm tall having a 1 cm inner diameter was filled with regenerated Dowex 1×8 styrene divinyl benzene ion exchange gel resin. The regenerated resin had a bulk density of about 56 pounds per cubic foot and was 50-100 U.S. standard mesh. Each end of the column was fitted with a steel wool retainer to hold the resin inside the column.

A NaCl brine solution was flowed downward through the column until it was detected coming out the bottom, to wet the resin. Then, about 10 ml. of a 23 weight percent NaOH aqueous solution was flowed upward through the column. This small amount of solution was added as a buffer-type solution to minimize the shock to the resin which occurs when a NaOH solution blends with a brine solution. Thereafter, a 50 weight percent NaOH aqueous solution at 50° C. and having a density of about 1.54 was flowed upward through the column at a space velocity of 2.40 hr$^{-1}$ (2 cc/min). The 50 percent NaOH solution contained 0.2% $NaClO_3$. A substantial portion of the $NaClO_3$ was removed from the caustic solution by the exchange of ions between the resin particles and the caustic solution. The solution contained less than 5 parts per million $NaClO_3$ leaving the column.

Sufficient $NaClO_3$ was removed to substantially deplete the ion exchange properties of the resin particles, causing the resin particles to shrink to about one half their original volume and to increase in bulk density to about 110 pounds per cubic foot.

The flow of the 50 percent NaOH solution then was stopped and a regeneration procedure was started. About 10 ml. of 23 percent NaOH was flowed downward through the column pushing the particles to the bottom. This caustic solution had a density of about 78 pounds per cubic foot. Thus, the resin remained at the bottom of the column since it had a density greater than the 23 percent caustic solution. Thereafter, a 25 weight percent NaCl aqueous solution was flowed downward through the unregenerated resin. The brine had a density of about 74 pounds per cubic foot. The brine solution regenerated the particles by exchanging ions therewith, thus causing the particles to expand in size to almost double their unregenerated size and to decrease in density to about 56 pounds per cubic foot. This density decrease to 56 pounds per cubic foot caused the particles to be displaced from the bed by the 74 pound per cubic foot NaCl solution. The particles thus rose to the top of the column as they expanded and decreased in density. When most of the particles had been regenerated, the flow of the brine solution was stopped. Then about 10 ml. of an aqueous 23 percent NaOH solution was passed upward through the cylinder, followed by more 50 percent caustic, thus repeating the removal and regenerating cycle.

What is claimed is:

1. In a method for regenerating gel ion exchange particles of the type wherein a regenerating fluid is flowed through a bed of unregenerated gel ion exchange particles and ions are exchanged between the fluid and the particles, thereby forming regenerated ion exchange particles;

the improvement comprising:

(a) flowing a regenerating fluid which has a density different from about 0.01 to about 100 lbs. per cu. ft. that of the regenerated particles to cause said regenerated particles to be displaced from the unregenerated bed at a first position in a column;

(b) displacing said particles from the unregenerated bed;

(c) flowing substantially all of said regenerated particles in a direction substantially countercurrent to that of the regenerating fluid; and (d) reforming the regenerated particles into a bed of regenerated particles at a second position in the column.

2. The method of claim 1 wherein the regenerating fluid has a density greater than that of the regenerated particles and is flowed in a generally downward direction.

3. The method of claim 1 wherein the regenerating fluid has a density less than that of the regenerated particles and is flowed in a generally upward direction.

4. The method of claims 1, 2 or 3 where the difference in density between the regenerating fluid and the regenerated particles is at least 0.1 pound per cubic foot.

5. The method of claims 1, 2 or 3 where the fluid is an aqueous fluid.

6. The method of claims 1, 2 or 3 where regenerated particles are at least 110 volume percent of the volume of unregenerated particles.

7. A method for removing $NaClO_3$ from an aqueous sodium hydroxide solution comprising:

(a) flowing a first aqueous sodium hydroxide solution containing $NaClO_3$ impurities through a bed of styrene divinyl benzene gel resin particles;

(b) removing at least a portion of the $NaClO_3$ impurities from the first sodium hydroxide solution by exchanging ions between the solution and the gel resin particles, thereby shrinking the particles;

(c) stopping the flow of the first sodium hydroxide solution;

(d) flowing a second sodium hydroxide solution through the bed of resin particles, wherein the second solution has a lower weight percent NaOH than the first solution;

(e) stopping the flow of the second solution;

(f) flowing an aqueous NaCl brine regenerating solution through the bed of particles;

(g) exchanging ions between the resin particles and the regenerating solution, thereby regenerating the resin particles and causing them to decrease in density and to expand in size;

(h) displacing the resin particles from the bed;

(i) flowing substantially all the regenerated resin particles in a direction substantially countercurrent to that of the regenerating fluid;

(j) reforming the regenerated particles into a bed of particles; and (k) stopping the flow of regenerating fluid.

8. The method of claim 7 where the first sodium hydroxide solution is 40–60 weight percent NaOH.

9. The method of claim 8 where the second sodium hydroxide solution is 15–30 weight percent NaOH.

10. The method of claim 7 where the first sodium hydroxide solution contains 25 to 10,000 parts per million $NaClO_3$.

* * * * *

UNITED STATES PATENT AND TRADEMARK OFFICE
CERTIFICATE OF CORRECTION

PATENT NO. : 4,421,864

DATED : December 20, 1983

INVENTOR(S) : John D. Watson, Sr.

It is certified that error appears in the above—identified patent and that said Letters Patent is hereby corrected as shown below:

On the cover page, under U. S. References Cited, insert --3,505,247  4/1970  Hetherington et al.  260/2.1--.

In Col. 1, line 49, delete "accordng" and insert --according--.

In Col. 5, line 61, insert the word --from-- at the beginning of the line.

Signed and Sealed this

Twenty-fourth Day of April 1984

[SEAL]

Attest:

GERALD J. MOSSINGHOFF

Attesting Officer

Commissioner of Patents and Trademarks